United States Patent
Wojcik et al.

(10) Patent No.: US 8,751,424 B1
(45) Date of Patent: Jun. 10, 2014

(54) SECURE INFORMATION CLASSIFICATION

(75) Inventors: Richard H. Wojcik, Bellevue, WA (US); Ping Xue, Redmond, WA (US); Stephen R. Poteet, Bellevue, WA (US); Philip Harrison, Seattle, WA (US)

(73) Assignee: The Boeing Company, Chicago, IL (US)

( * ) Notice: Subject to any disclaimer, the term of this patent is extended or adjusted under 35 U.S.C. 154(b) by 119 days.

(21) Appl. No.: 13/327,046

(22) Filed: Dec. 15, 2011

(51) Int. Cl.
*G06F 15/18* (2006.01)

(52) U.S. Cl.
USPC .......................................................... 706/20

(58) Field of Classification Search
None
See application file for complete search history.

(56) References Cited

U.S. PATENT DOCUMENTS

| | | | | |
|---|---|---|---|---|
| 5,948,058 | A * | 9/1999 | Kudoh et al. | 709/206 |
| 7,028,250 | B2 * | 4/2006 | Ukrainczyk et al. | 715/202 |
| 7,130,885 | B2 * | 10/2006 | Chandra et al. | 709/206 |
| 7,142,690 | B2 * | 11/2006 | Hyakutake et al. | 382/100 |
| 7,178,033 | B1 * | 2/2007 | Garcia | 713/184 |
| 7,284,191 | B2 * | 10/2007 | Grefenstette et al. | 715/230 |
| 7,401,087 | B2 * | 7/2008 | Copperman et al. | 707/737 |
| 7,483,891 | B2 * | 1/2009 | Liu et al. | 1/1 |
| 7,519,998 | B2 * | 4/2009 | Cai et al. | 726/24 |
| 7,606,784 | B2 * | 10/2009 | Mathias et al. | 706/52 |
| 7,673,234 | B2 * | 3/2010 | Kao et al. | 715/255 |
| 7,917,460 | B2 * | 3/2011 | Talbot et al. | 706/59 |
| 7,958,147 | B1 * | 6/2011 | Turner et al. | 707/783 |
| 8,115,869 | B2 * | 2/2012 | Rathod et al. | 348/465 |
| 2002/0022956 | A1 * | 2/2002 | Ukrainczyk et al. | 704/9 |
| 2003/0217052 | A1 * | 11/2003 | Rubenczyk et al. | 707/3 |
| 2004/0148154 | A1 * | 7/2004 | Acero et al. | 704/1 |
| 2004/0261016 | A1 * | 12/2004 | Glass et al. | 715/512 |
| 2005/0022114 | A1 * | 1/2005 | Shanahan et al. | 715/513 |
| 2005/0060643 | A1 * | 3/2005 | Glass et al. | 715/501.1 |
| 2005/0086194 | A1 * | 4/2005 | Suzuki et al. | 707/1 |
| 2006/0085181 | A1 * | 4/2006 | Komamura et al. | 704/9 |
| 2006/0143175 | A1 * | 6/2006 | Ukrainczyk et al. | 707/6 |
| 2007/0094216 | A1 * | 4/2007 | Mathias et al. | 706/52 |
| 2007/0136397 | A1 * | 6/2007 | Pragada et al. | 707/204 |
| 2008/0147790 | A1 * | 6/2008 | Malaney et al. | 709/203 |
| 2008/0222734 | A1 * | 9/2008 | Redlich et al. | 726/26 |
| 2009/0178137 | A1 * | 7/2009 | Branson et al. | 726/22 |
| 2010/0011000 | A1 * | 1/2010 | Chakra et al. | 707/9 |
| 2010/0186091 | A1 * | 7/2010 | Turner et al. | 726/26 |
| 2011/0046951 | A1 * | 2/2011 | Suendermann et al. | 704/236 |
| 2011/0078152 | A1 * | 3/2011 | Forman et al. | 707/747 |
| 2014/0013433 | A1 * | 1/2014 | Turner et al. | 726/23 |

* cited by examiner

*Primary Examiner* — Kakali Chaki
*Assistant Examiner* — Fuming Wu
(74) *Attorney, Agent, or Firm* — Toler Law Group, PC

(57) ABSTRACT

In one embodiment a method to create a system to manage documents with sensitive or classified content comprises extracting a list of text features enabling interaction with the user developing the system to create a rule-based classifier based on the list of text features and one or more synonymous features, applying the rule-based classifier to one or more selected documents to tag a set of documents with the sensitive or classified information they contain, training a statistical text classifier using the tagged documents generated as a training set, applying the trained statistical text classifier to the training set, and reapplying the refined rule-based classifier to the one or more documents to tag a set of documents with the sensitive or classified information they contain. Other embodiments may be described.

12 Claims, 4 Drawing Sheets

SECURE INFORMATION CLASSIFICATION

FIELD OF THE DISCLOSURE

This invention relates to systems and methods to detect and classify sensitive information, and to manage documents containing sensitive information.

BACKGROUND

Organizations manage information having varying levels of security. Highly sensitive information may require a high security clearance to access, while less sensitive information may be accessed with a lower security clearance. Documents containing sensitive information may be classified according to security levels and access to the documents may be granted only to personnel having an appropriate security clearance.

As part of routine knowledge and document management processes newly generated documents must be analyzed and classified into an appropriate security category. Also, existing documents are routinely analyzed for modification and redaction in order to move them from a higher security level to a lower one (downgrading) or release them to unclassified networks (declassification). Presently, this process is performed by humans, sometimes assisted by generic desktop software tools, and is expensive, unduly subjective, and error-prone. Thus, systems and methods that systematically determine and classify secure information may find utility.

SUMMARY

In various aspects, systems and methods to manage sensitive or classified information are provided. The invention proposes to take advantage of the respective strengths and weaknesses of rule-based classifiers and statistical classifiers for this purpose, especially in the development of such a system, by combining them into a single system. Rule-based classifiers tend to be more precise and their development leverages the knowledge and intuitions of the analyst/user. However, the analyst/user cannot anticipate all the ways documents might express some of the concepts related to sensitive classification. They can recognize the sensitive expressions when they see them but cannot always know in advance the words and phrases that will make reference to them. Statistical classifiers, on the other hand, are trained from data that has been tagged by some analyst, and can automatically find the words and phrases that best capture the analyst's judgment about what concepts a document expresses. However, developing a tagged set of documents that can be used to train a statistical classifier is a time consuming task. We propose to use an initial rule-based classifier developed by an analyst to perform an initial tagging of a set of documents and use the results to train a statistical classifier to refine that initial tagging, perhaps suggesting additional documents that should have been tagged and additional words and phrases that are correlated with those concepts. The process can iterate until a desired level of performance is reached. The resulting system, consisting of a final set of Boolean rules and a statistical classifier, can then be used, either by the original analyst/user or by other users, to suggest classification categories for other documents and what words and phrases were used by the system in determining those classification categories, for use in classification, declassification, or downgrading the document.

In some embodiments a system as described herein receives a security policy guide that specifies limitations on what types of information can be passed to various types of people and organizations with specified security clearance levels. The system first interacts with the user to highlight and possibly paraphrase informal and high-level rules in the security policies to allow automatic extraction of words and phrases from those rules. It then displays those words and phrases to the security analyst to use in constructing a set of formal rules (in one implementation, Boolean rules) intended to capture these limitations. The words and phrases may be supplemented by related words and phrases from on-line dictionaries and other lexical resources. The system then receives a first set of formal rules from the security analyst operating the system. The system then applies the first set of formal rules to a first set of documents to generate a first set of tags for the first set of documents. The first set of tags is intended to approximate the limitations specified in the security policy guide. The first set of documents and the first set of tags are then used by the system to train a statistical classifier (in one implementation, a Naïve Bayes classifier). The trained statistical classifier is then applied to the first set of documents to generate a second set of tagged documents representing the limitations specified in the security policy guide. In some embodiments the documents that are classified differently by the statistical classifier than the first set of rules and the words and phrases used by the statistical classifier may be applied as feedback to refine the first set of rules to create a second set of rules. This feedback process may be repeated iteratively to refine the set of rules and the statistical text classifier until the output is satisfactory to the security analyst. The resulting system can then be used by other users to determine the appropriate level of classification of a new document or what sections need to be redacted in order to release it to another organization with a lower level of security classification than the document is marked for.

Thus, in one embodiment, there is provided a method to develop document classification in a document classification system that comprises (1) extracting a list of key words and phrases from a policy guide or set of informal rules, (2) receiving a set of Boolean rules from a user of the system based on those words and phrases, (3) applying the Boolean rule set to selected documents to generate a set of tagged training documents, (4) using the tagged training set to train a statistical classifier, (5) applying the statistical classifier to the training set, possibly tagging additional documents as sensitive and generating an additional set of words or phrases correlated to the sensitive concepts in the policy guide, and (6) presenting the newly or differently classified documents and the additional words or phrases in the user interface for review by a user of the system.

In another embodiment there is provided a computer-based system to develop a document classification system comprising a non-transitory memory module, a computer-based processing device coupled to memory and logic instruction stored in the non-transitory memory module which, when executed by the processing device, the logic instructions configure the processing device to receive, from a user of the system, a Boolean rule set, to apply the Boolean rule set to one or more selected documents to generate a set of tagged training documents, to use the tagged training documents to train a statistical text classifier, to apply the trained statistical text classifier to the training set, possibly tagging additional documents and generating additional words or phrases correlated to the tags, and to provide the newly classified documents and the additional words or phrases to the user interface for review by a user of the system.

In another embodiment there is provided a computer program product comprising logic instructions stored in a non-transitory memory module which, when executed by the processing device, configures the processing device to manage document classification in a document classification system by performing operations that comprise receiving from a user of the system a list of keywords or phrases to build a Boolean rule set based on sensitive information policies defined in a policy guide, applying the Boolean rule set to one or more selected documents to generate a set of tagged training documents, training a statistical text classifier with the training set, thereby generating additional words or phrases correlated to the list of sensitive concepts in the policy guide, applying the trained statistical classifier to the training documents to generate a new classification for one or more documents in the training set, and providing the new classification and the additional words or phrases to the user interface for review by a user of the system.

The features, functions and advantages discussed herein can be achieved independently in various embodiments described herein or may be combined in yet other embodiments, further details of which can be seen with reference to the following description and drawings.

BRIEF DESCRIPTION OF THE DRAWINGS

The detailed description is described with reference to the accompanying figures.

DETAILED DESCRIPTION

Figure 1:
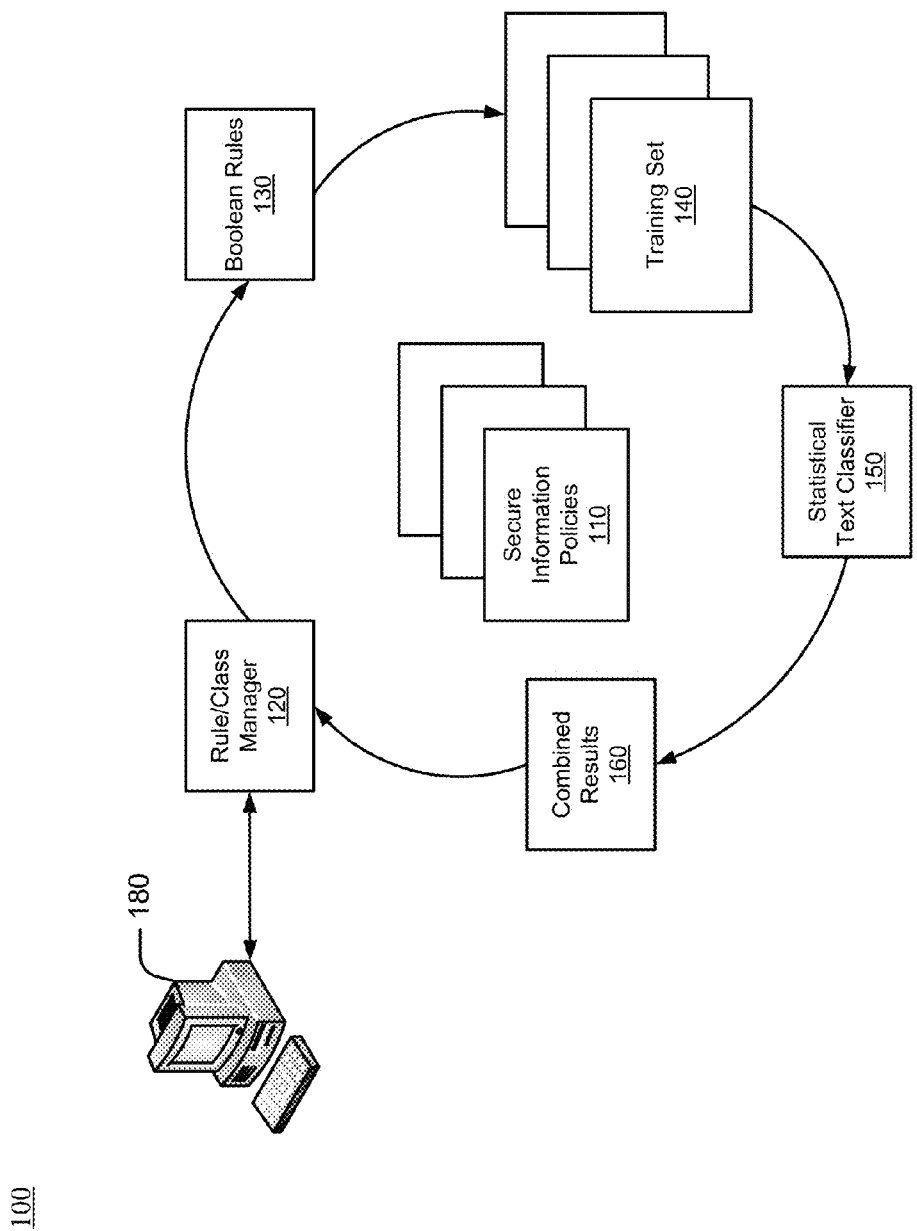
FIG. 1 is a schematic illustration of an environment in which secure information classification may be implemented, according to embodiments.

Described herein are exemplary methods and systems for secure information classification. In some embodiments the methods described herein enable a user of the system to implement a process pursuant to which Boolean rules and a statistical text classifier may be refined iteratively to enhance the efficacy of text classification and reveal the words and phrases relevant to a given classification. A set of rules, which in one implementation consists of Boolean rules, may be used to identify and tag concepts represented by associations of words in a defined set of one or more documents, which are then used as a "training set" for the statistical classification system, which in one implementation consists of Bayesian classifiers. The tagged documents are provided to a text classifier, which analyzes the documents and assigns one or more properties to the documents, which may include a document classification within a security classification scheme. The trained statistical classifier is then applied to the training set of documents, possibly resulting in new or different expressions being considered sensitive. The output of the statistical text classifier is provided as feedback to a user of the system, who can revise or update the content of the Boolean rules in response thereto. In this manner an iterative process may be implemented which enables a user of the system to refine the Boolean search terms and logic to tune the text classifier.

There are several purposes that this invention can serve exemplified by the embodiments described herein. For example, documents generated by a government project may need to be given a certain level of security classification to protect them from being passed to people or organizations that do not have the proper level of clearance. Similarly, documents in both government and non-government, settings may contain information that needs to be protected by the International Traffic in Arms Regulations (ITAR) from being given to non-US persons. Also, documents generated inside a company may need to be reviewed by the company for potential exposure of any of the company's Intellectual Property before they can be released or published outside the company.

Further, classified government documents (i.e. those with a security classification) are typically supposed to be reviewed for declassification after a certain amount of time. At this point, they need to be assessed for any information that still needs to be kept classified at some level.

Further still, classified government documents may need to be shared in part with other organizations with a lower level of clearance than the document is marked for (downgraded). If only certain parts of the document (words, phrases, sentences, paragraphs, or whole sections) actually contain information at the higher clearance level, the document may be sharable after those sections are redacted (blacked out).

More generally, the subject matter described herein enables a process for creating a system specialized to a particular type of security classification system that will automatically suggest a security classification level for a document and indicate what words, or phrases in the document suggest that it requires that level of security classification. This can help guide a security analyst using the (already developed) system to determine 1) whether a document should be classified at a certain level; 2) whether it has any information that would prevent it from being declassified when its period of review comes up; or 3) what parts of a document make it sensitive at various levels, so that the analyst can determine if it can be released after some parts are redacted and what parts those might be.

The term of "classification" (or "classified") used in this application have two related but distinct concepts: (i) levels of security classification (e.g. Secret, Top Secret levels of classification), and (ii) text classification (e.g. tags, categories or classes) that one assigns words, phrases or sentences in a document. Systems and methods described herein implement a combination of rule-based (e.g. Boolean) system and a statistical (e.g. Bayesian) system to enable automatic text classification assigning a level of security classification to a document by detecting the sensitive information (represented by words and phrases) that is relevant to that level of security classification contained in the document.

In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

By way of overview, FIG. 1 is a schematic illustration of an environment 100 in which secure information classification may be implemented, according to embodiments. Referring to FIG. 1, in an exemplary embodiment an organization may maintain secure information policies 110 which govern the control of and access to secure information managed by the organization. Secure information policies may be expressed in written regulations or policies which may be managed by personnel with supervisory authority over the information.

There are two aspects of the use of the system: 1) the development of an automatic system for classifying documents or parts of documents and revealing the relevant text (words and phrases) and 2) the use of an already developed system to determine the appropriate level of security classification or sensitivity of a document and what parts of it contribute to that (so that they can be redacted in order to make it possible to release it at a lower level of security classification or sensitivity.

FIG. 1 illustrates the components and information flow involved during the development of a particular instance of the sensitive information classification system in some embodiments. Users may interact with the environment via one or more user interfaces on a computing system 180. In some embodiments a user may interact with a rule/class manager module 120 to implement one or more Boolean rules 130 for text analysis. The Boolean text classifier 130 may be applied to tag a training set 140 of documents with metadata, and the tagged documents may be provided to a statistical text classifier 150 for training. The combined results 160 of the Boolean rules analysis and the text classifier are provided as feedback to the rule/class manager module 120 such that a user of the system may modify the Boolean rules 130, which in turn can be used to tune the statistical text classifier 150. The process can iterate until the user is satisfied that the resulting system (consisting of both a set of Boolean rules and a statistical classifier) is sufficiently accurate or as accurate as possible given the security guide. For example, the process may iterate until the classification scheme satisfies a desired accuracy threshold. Aspects of the environment 100 will be explained in greater detail with reference to FIGS. 2-5.

Figure 2:
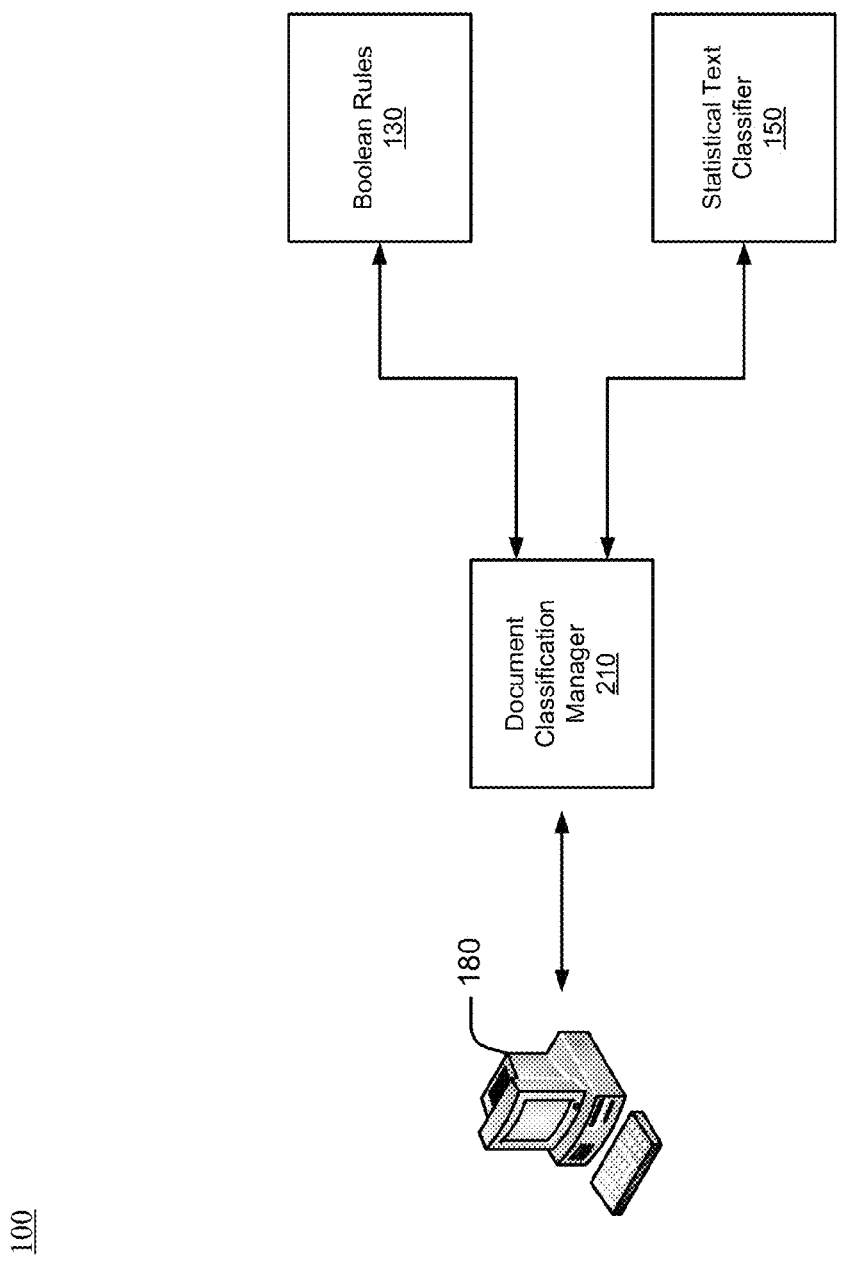
FIGS. 2-4 are flowcharts illustrating operations in methods for secure information classification, according to embodiments.

FIG. 2 illustrates the components and information flow that are involved during the use of an already developed instance of the sensitive information classification system in some embodiments. Again, users may interact with the environment via one or more user interfaces on a computing system 180. The user submits a document to a Document Classification Manager module 210. The Document Classification Manager then submits the document to one or more Boolean Rules module 220, the final results of the Boolean rules from the development phase. The Document Classification Manager module 210 also submits the document to the Statistical Text Classifier module 230. The Document Classification Manager module 210 collects the results from both the Boolean Rules module 220 and the Statistical Text Classifier module 230, both the class or classes assigned to the document by modules 220 and 230 and the words and phrases used to determine each class, and displays them to the user.

Figures 3, 4:
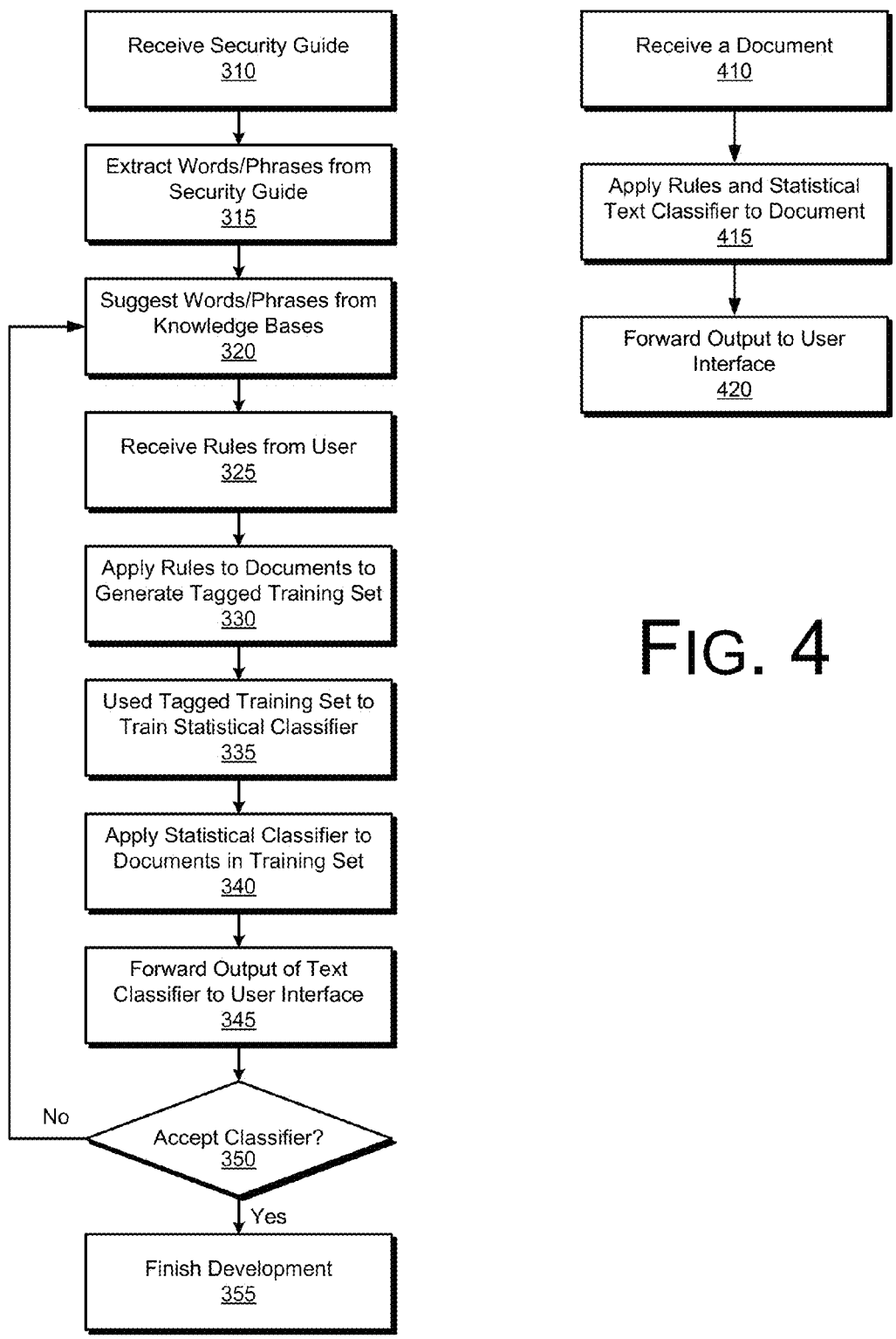
Figure 5:
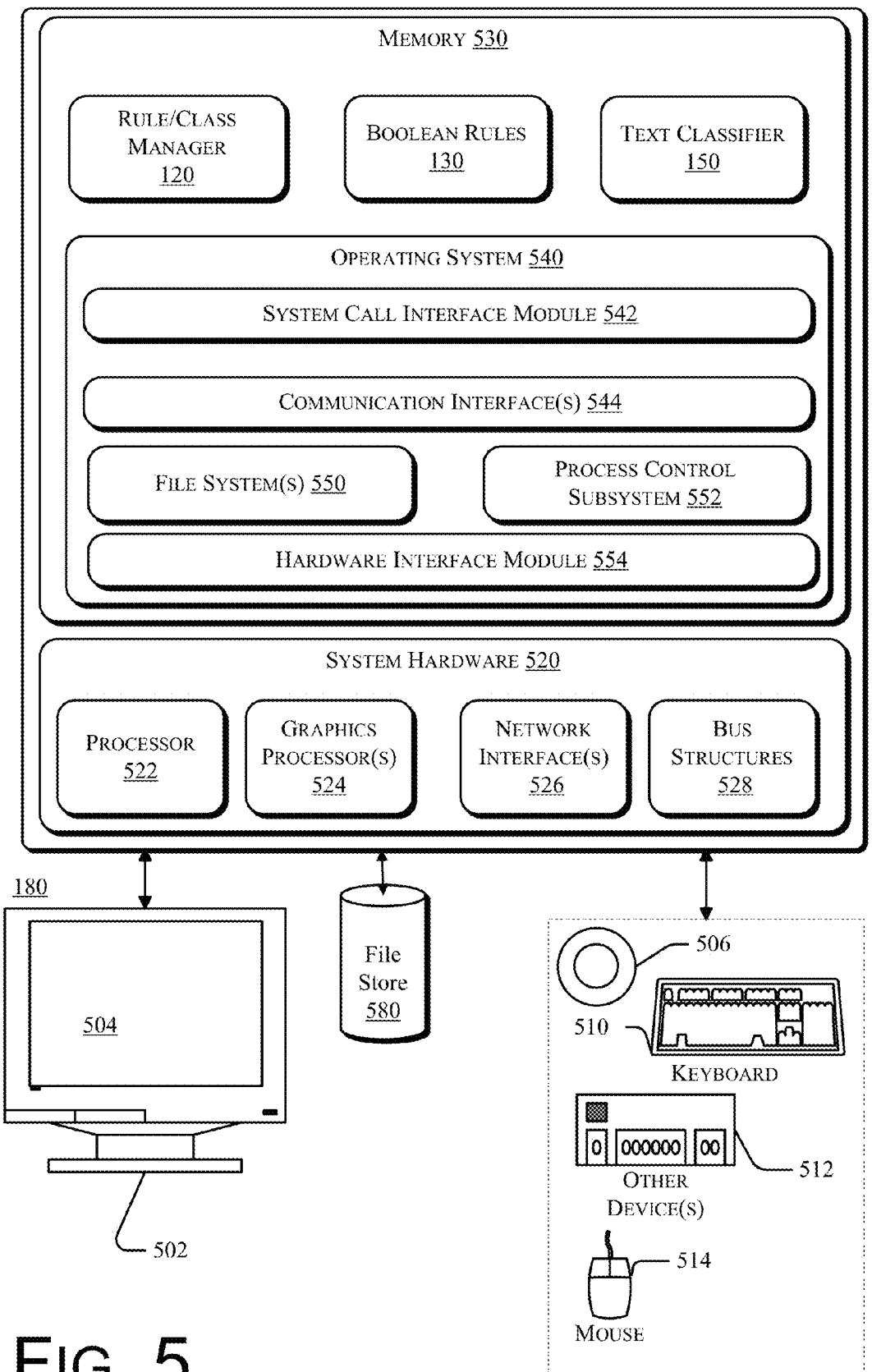
FIG. 5 is a schematic illustration of a computing system which may be adapted to implement secure information classification, according to embodiments.

FIGS. 3-4 are flowcharts illustrating operations in methods for the development and use of secure information classification systems, according to embodiments, and FIG. 5 is a schematic illustration of a computing system which may be adapted to implement secure information classification, according to embodiments. In some embodiments the methods described herein may be implemented as logic instructions stored in tangible computer readable medium, e.g., software, which may be executed by a processing device to implement secure information classification procedures.

FIG. 3 illustrates operations for the development of a particular instance of a secure information classification system. In some embodiments a method to implement secure information classification begins with the receipt of a security guide (operation 310) and the semi-automatic extraction of words and phrases exemplifying the rules put forth in the security guide (operation 315). The system may optionally use external sources of lexical knowledge such as WordNet or on-line dictionaries or thesauri to suggest synonyms and other semantically related words and phrases (operation 320). For example, one or more words associated with a specific security classification may be extracted from the security guide and the one or more words may be automatically expanded based on identifying synonyms. The system will then proceed with the receipt of one or more Boolean rules (operation 325), e.g. from a user of the system via a user interface using the words and phrases suggested in operations 315 and 320, optionally supplemented by the personal knowledge of an intelligence analyst. By way of example, a user may enter one or more words alone or in combination with one or more Boolean operators (e.g., AND, OR, CONSEC, etc). During subsequent iterations, the words may also be obtained from the results of the statistical text classifier, again optionally supplemented by external sources of lexical knowledge sources and the personal knowledge of an intelligence analyst.

At operation 330 the Boolean rules are applied to one or more selected documents. When text in the selected documents satisfies a Boolean Rule the text may be tagged with a metadata tag indicating that the text satisfied that Boolean Rule and contains sensitive or classified information. The resulting set of tagged documents can be used as a set of training documents for the Statistical Text Classifier module 150.

At operation 335 a Statistical Text Classifier module 150 is trained using the set of training documents. One or more known text classifiers may be used to implement the text classifier in this disclosure. For example, suitable text classifiers include the Naive Bayes classifier or the Support Vector Machine (SVM). These text classifiers are known in the art and a detailed discussion of their operation is not necessary for an understanding of the disclosure. In general a text classifier looks at features of text, such as words or phrases. The text classifier determines a function or rule for assigning a category or class to a piece of text based on features of the text, such as words or phrases. The text classifier may also receive from a user of the system, a classifier threshold for a specific classification. This threshold may be used to automatically associate a document with the specific classification when the threshold is exceeded.

At operation 340 the trained Statistical Text Classifier module 150 is applied to the training set of documents. This may result in additional documents being tagged as sensitive or having a particular security classification level. Alternatively or in addition, it may suggest that documents that have been tagged as sensitive by the Boolean Rules need not be so tagged. In addition, the Statistical Text Classifier will also return the words and phrases that it used to determine the appropriate level of sensitivity or security classification of the document, which may differ from those used in the Boolean Rules. As described above, the Statistical Text Classifier may automatically associate a document with a specific classification when a user provided threshold is exceeded.

At operation 345 the output of the Boolean rules 130 and the Statistical Text Classifier module 150 are combined to produce a set of combined results 160, which are made accessible to a user of the system via a user interface. If at operation 350 the user decides that the system is producing sufficiently accurate results on the first set of documents or that no further improvement is possible, then the development phase for the sensitive information classification system ends. Otherwise, control passes to operation 320. In this regard, operations 320 through 350 form a loop which may be iterated to enable a user of the system both to modify the Boolean Rules module 130 and to tune the Statistical Text Classifier module 150.

FIG. 4 illustrates operations for the use of an already developed instance of a secure information classification system. In some embodiments the system begins with receipt of a document by the system (operation 410). The final set of Boolean Rules and the final Statistical Text Classifier resulting from the development phase are applied to the document (operation 415). The results of either or both of these, including the tags or classes they assign the document and the words and phrases in the document that they use to make the assignment (the set of combined results 160), are made accessible to the user via a user interface (operation 420).

As described briefly above, in some embodiments secure information classification systems and methods may be implemented in the context of a security classification scheme pursuant to which access to information may be restricted based upon a security credential associated with an entity attempting to access the information. Systems and methods as described herein may be used as part of an initial classification process to classify newly generated documents or as part of a review process undertaken to review a security status of existing documents. In addition, they may be used to determine whether the document can be released at a lower level of classification with appropriate redactions, using the words and phrases suggested by the system to guide the determination of what words, sentences, or sections to redact.

The operations depicted in FIGS. 3-4 may be implemented as logic instructions store. FIG. 5 is a schematic illustration of a computing system 180 which may be adapted to implement secure information classification, according to embodiments. Referring to FIG. 5, in one embodiment, system 180 may include one or more accompanying input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 180 to receive input from a user.

The system 180 includes system hardware 520 and memory 530, which may be implemented as random access memory and/or read-only memory. A file store 580 may be communicatively coupled to system 180. File store 580 may be internal to computing device 508 such as, e.g., one or more hard drives, CD-ROM drives, DVD-ROM drives, or other types of storage devices. File store 580 may also be external to computer 508 such as, e.g., one or more external hard drives, network attached storage, or a separate storage network.

System hardware 520 may include one or more processors 522, at least one graphics processor 524, network interfaces 526, and bus structures 528. In one embodiment, processor 522 may be embodied as an Intel® Core2 Duo® processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processors 524 may function as adjunct processors that manage graphics and/or video operations. Graphics processors 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 128. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 508. In one embodiment, operating system 540 includes a hardware interface module 554 that provides an interface to system hardware 520. In addition, operating system 540 may include a file system 550 that manages files used in the operation of computing device 508 and a process control subsystem 552 that manages processes executing on computing device 508.

Operating system 540 may include (or manage) one or more communication interfaces that may operate in conjunction with system hardware 120 to transceive data packets and/or data streams from a remote source. Operating system 540 may further include a system call interface module 542 that provides an interface between the operating system 540 and one or more application modules resident in memory 530. Operating system 540 may be embodied as a UNIX operating system or any derivative thereof (e.g., Linux, Solaris, etc.) or as a Windows® brand operating system, or other operating systems.

In various embodiments, the system 180 may be embodied as a personal computer, a laptop computer, a personal digital assistant, a mobile telephone, an entertainment device, or another computing device.

In one embodiment, memory 530 includes one or more logic modules embodied as logic instructions encoded on a tangible, non transitory memory to impart functionality to the system 180. The embodiment depicted in FIG. 5 comprises a rule/class module 120, and a text classifier module 150, which implement the operations described with reference to FIGS. 2-4.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A method for using a system to manage documents sensitive or classified content with a predetermined classifier threshold, comprising:
 (a) extracting, from a security policy guide or other informal set of rules, a list of text features;

(b) enabling interaction with a user configuring the system to create a rule-based classifier based on the list of text features and one or more synonymous features that capture sensitive or classified information in the security policy guide or the other informal set of rules;

(c) applying the rule-based classifier to one or more selected documents to tag a set of documents with the sensitive or classified information they contain to generate tagged documents;

(d) training a statistical text classifier using the tagged documents generated in (c) as a training set;

(e) applying the statistical text classifier to the training set to suggest additional documents that should be tagged and to generate additional text features for detecting the sensitive or classified information;

(f) providing the additional documents and the additional text features to a user interface for review and comparison by the user to update the training set and the list of text features and the one or more synonymous features;

(g) refining the rule-based classifier based on the training set, the list of text features, and the one or more synonymous features generated in (f); and (h) repeating operations (b) through (g) until a classification scheme satisfies the predetermined classifier threshold.

2. The method of claim 1, further comprising:
applying the rule-based classifier to one or more selected documents to tag a set of documents with the sensitive or classified information they contain so that it creates training set for the statistical classifier.

3. The method of claim 1, further comprising:
extracting, from the security policy guide or other informal set of rules, the one or more synonymous features, wherein the text features are words and phrases, and the one or more synonymous features are one or more synonyms of those words and phrases.

4. The method of claim 1, wherein the rule-based classifier is further based on extracted words and phrases, and the one or more synonyms of those words and phrases automatically identified using additional lexical resources.

5. The method of claim 1, further comprising:
extracting, from the security policy guide, one or more words which are associated with a specific classification; and
automatically expanding extracted words and phrases by identifying the one or more synonyms using additional resources.

6. The method of claim 1, further comprising:
extracting, from the security policy guide, one or more words which are associated with a specific classification; and
automatically associating a first document with the specific classification when the one or more words are located in the first document.

7. A computer-based system for using the system to manage document classification with a predetermined classifier threshold, the system comprising:
a non-transitory memory module;
a computer-based processing device coupled to memory; and
logic instruction stored in the non-transitory memory module which, when executed by the processing device, configures the processing device to:
(a) extract, from a security policy guide or other informal set of rules, a list of text features;
(b) enable interaction with a user to configure the system to create a rule-based classifier based on the list of text features and one or more synonymous features that capture sensitive or classified information in the security policy guide or the other informal set of rules;
(c) apply the rule-based classifier to one or more selected documents to tag a set of documents with the sensitive or classified information they contain to generate tagged documents;
(d) train a statistical text classifier using the tagged documents generated in (c) as a training set;
(e) apply the statistical text classifier to the training set to suggest additional documents that should be tagged and to generate additional text features for detecting the sensitive or classified information;
(f) provide the additional documents and the additional text features to a user interface for review and comparison by the user to update the training set and the list of text features and the one or more synonymous features;
(g) refine the rule-based classifier based on the training set and the list of text features and the one or more synonymous features generated in (f); and
(h) repeat operations (b) through (g) until a classification scheme satisfies the predetermined classifier threshold.

8. The computer-based system of claim 7, wherein the rule-based classifier is a Boolean rule classifier.

9. The computer-based system of claim 7, wherein the statistical text classifier is a Naïve Bayesian Classifier, or a Support Vector Machine (SVM).

10. The computer-based system of claim 7, further comprising logic instructions which, when executed by the processing device, configures the processing device to:
extract, from the security policy guide, one or more words which are associated with a specific classification; and
automatically associate a first document with the specific classification when the one or more words are located in the first document.

11. A computer program product comprising logic instruction stored in a non-transitory memory module which, when executed by a processing device, configures the processing device to manage document classification in a document classification system with a predetermined classifier threshold by performing operations comprising:
(a) extracting, from a security policy guide or other informal set of rules, a list of text features;
(b) enabling interaction with a user to configure the document classification system to create a rule-based classifier based on the list of text features and one or more synonymous features that capture sensitive or classified information in the security policy guide or the other informal set of rules;
(c) applying the rule-based classifier to one or more selected documents to tag a set of documents with the sensitive or classified information they contain to generate tagged documents;
(d) training a statistical text classifier using the tagged documents generated in (c) as a training set;
(e) applying the statistical text classifier to the training set to suggest additional documents that should be tagged and to generate additional text features for detecting the sensitive or classified information;
(f) providing the additional documents and the additional text features to a user interface for review and comparison by the user to update the training set and the list of text features and the one or more synonymous features;

(g) refining the rule-based classifier based on the training set and the list of text features and the one or more synonymous features generated in (f); and
(h) repeating operations (b) through (g) until a classification scheme satisfies the predetermined classifier threshold.

12. The computer program product of claim 11, further comprising logic instruction which, when executed by the processing device, configure the processing device to:
   extract, from the security policy guide, one or more words which are associated with a specific classification; and
   automatically associate a first document with the specific classification when the one or more words are located in the first document.

\* \* \* \* \*